(12) United States Patent
Jia

(10) Patent No.: US 11,076,030 B2
(45) Date of Patent: Jul. 27, 2021

(54) ELECTRONIC DEVICE AND CONTROL METHOD THEREOF

(71) Applicant: GUANGDONG OPPO MOBILE TELECOMMUNICATIONS CORP., LTD., Guangdong (CN)

(72) Inventor: Yuhu Jia, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/945,029

(22) Filed: Jul. 31, 2020

(65) Prior Publication Data
US 2020/0366774 A1    Nov. 19, 2020

Related U.S. Application Data

(63) Continuation of application No. PCT/CN2019/078330, filed on Mar. 15, 2019.

(30) Foreign Application Priority Data

Mar. 31, 2018    (CN) .......................... 201810282753.4

(51) Int. Cl.
*H04B 1/38* (2015.01)
*H04M 1/02* (2006.01)

(52) U.S. Cl.
CPC ....... *H04M 1/0264* (2013.01); *H04M 1/0225* (2013.01); *H04M 1/0237* (2013.01); *H04M 1/0243* (2013.01)

(58) Field of Classification Search
CPC .. H04M 1/026; H04M 1/0264; H04M 1/0237; H04M 1/0239; H04M 1/0225; H04M 1/0243
See application file for complete search history.

(56) References Cited

U.S. PATENT DOCUMENTS

2002/0077145 A1    6/2002  Kamiya et al.
2006/0152614 A1    7/2006  Wang et al.
(Continued)

FOREIGN PATENT DOCUMENTS

CN    202425231    9/2012
CN    103220383    7/2013
(Continued)

OTHER PUBLICATIONS

WIPO, ISR for PCT/CN2019/078330, Jun. 3, 2019.
(Continued)

*Primary Examiner* — Tuan Pham
(74) *Attorney, Agent, or Firm* — Hodgson Russ LLP

(57) ABSTRACT

An electronic device is provided. The electronic device includes a device body and a rotatable module. The rotatable module is rotatably connected to the device body. The device body defines a receiver window. The rotatable module includes a rotatable base, a camera module, and a receiver module, where the camera module and the receiver module are mounted in the rotatable base. The receiver module defines a first sound-guide channel on a side of the receiver module and a second sound-guide channel on an opposite side of the receiver module. The first sound-guide channel is in communication with the receiver window when the rotatable module is folded with respect to the device body, and the second sound-guide channel is in communication with the receiver window when the rotatable module is unfolded with respect to the device body. A control method of an electronic device is also provided.

20 Claims, 11 Drawing Sheets

(56) References Cited

U.S. PATENT DOCUMENTS

| | | | |
|---|---|---|---|
| 2006/0261257 A1 | 11/2006 | Hwang | |
| 2007/0070189 A1 | 3/2007 | Lee | |
| 2009/0111515 A1* | 4/2009 | Joo | H04M 1/0208 |
| | | | 455/556.1 |
| 2011/0281618 A1* | 11/2011 | Chambers | H04N 5/2354 |
| | | | 455/556.1 |
| 2018/0091716 A1* | 3/2018 | Brand | H04N 7/185 |

FOREIGN PATENT DOCUMENTS

| | | |
|---|---|---|
| CN | 203968178 | 11/2014 |
| CN | 104202481 | 12/2014 |
| CN | 104917898 | 9/2015 |
| CN | 106454650 | 2/2017 |
| CN | 106657456 | 5/2017 |
| CN | 206251153 | 6/2017 |
| CN | 107124490 | 9/2017 |
| CN | 107734092 | 2/2018 |
| EP | 1387572 | 2/2004 |
| EP | 1553748 | 7/2005 |
| JP | 3818280 | 9/2006 |
| KR | 20060076492 | 7/2006 |

OTHER PUBLICATIONS

SIPO, First Office Action for CN Application No. 201810282753.4, dated Jun. 28, 2020.
EPO, Extended European Search Report for European Application No. 19777881.4, dated Feb. 17, 2021.

\* cited by examiner

ELECTRONIC DEVICE AND CONTROL METHOD THEREOF

CROSS-REFERENCE TO RELATED APPLICATIONS

This application is a continuation of International Application No. PCT/CN2019/078330, filed Mar. 15, 2019, which claims priority to Chinese Patent Application No. 2018102827534, filed Mar. 31, 2018, the entire disclosures of which are incorporated herein by reference.

TECHNICAL FIELD

This disclosure relates to the technical field of electronic devices, and particularly to an electronic device and a control method thereof.

BACKGROUND

Electronic devices with a large screen-to-body ratio have a good visual experience. Users are generally favoring an electronic device having a large screen that is compact and portable. However, the layout of functional components in such electronic devices, such as a camera module and a receiver module, can limit improvement of the screen-to-body ratio of the electronic device, thereby reducing user experience.

SUMMARY

According to embodiments of the present disclosure, an electronic device and a control method thereof is provided.

An electronic device can include a device body and a rotatable module. The device body may defines a receiver window. The rotatable module can be rotatably connected to the device body. The rotatable module can include a rotatable base, a camera module, and a receiver module, where the camera module and the receiver module are mounted in the rotatable base. The receiver module may define a first sound-guide channel on a side of the receiver module and a second sound-guide channel on an opposite side of the receiver module. When the rotatable module is folded with respect to the device body, the first sound-guide channel can be in communication with the receiver window. When the rotatable module is unfolded with respect to the device body, the second sound-guide channel can be in communication with the receiver window.

According to an embodiment, a control method of an electronic device is provided. The method can be applicable to an electronic device. The electronic device can include a device body and a rotatable module. The device body may define a receiver window. The rotatable module can be rotatably connected to the device body. The rotatable module may include a rotatable base, a camera module, and a receiver module, where the camera module and the receiver module are mounted in the rotatable base. The receiver module can define a first sound-guide channel on a side of the receiver module and a second sound-guide channel on an opposite side of the receiver module. When the rotatable module is folded with respect to the device body, the first sound-guide channel can be in communication with the receiver window. When the rotatable module is unfolded with respect to the device body, the second sound-guide channel can be in communication with the receiver window. The electronic device can further include a controller. The controller can receive an extension signal and controls the rotatable module to rotate to a first state according to the extension signal, where in the first state, the rotatable module is unfolded with respect to the device body. The controller can receive a retraction signal and controls the rotatable module to rotate to a second state according to the retraction signal, where in the second state, the rotatable module is folded with respect to the device body.

BRIEF DESCRIPTION OF THE DRAWINGS

To describe embodiments of the present disclosure more clearly, the following briefly describes the accompanying drawings. The accompanying drawings in the following description illustrate some embodiments of the present disclosure. Those of ordinary skill in the art may also obtain other drawings based on these accompanying drawings without creative effort.

DETAILED DESCRIPTION

The present application is described in detail below with reference to the accompanying drawings and specific embodiments. It should be noted that embodiments and features in the embodiments can be combined with each other if not conflict.

Figure 1:
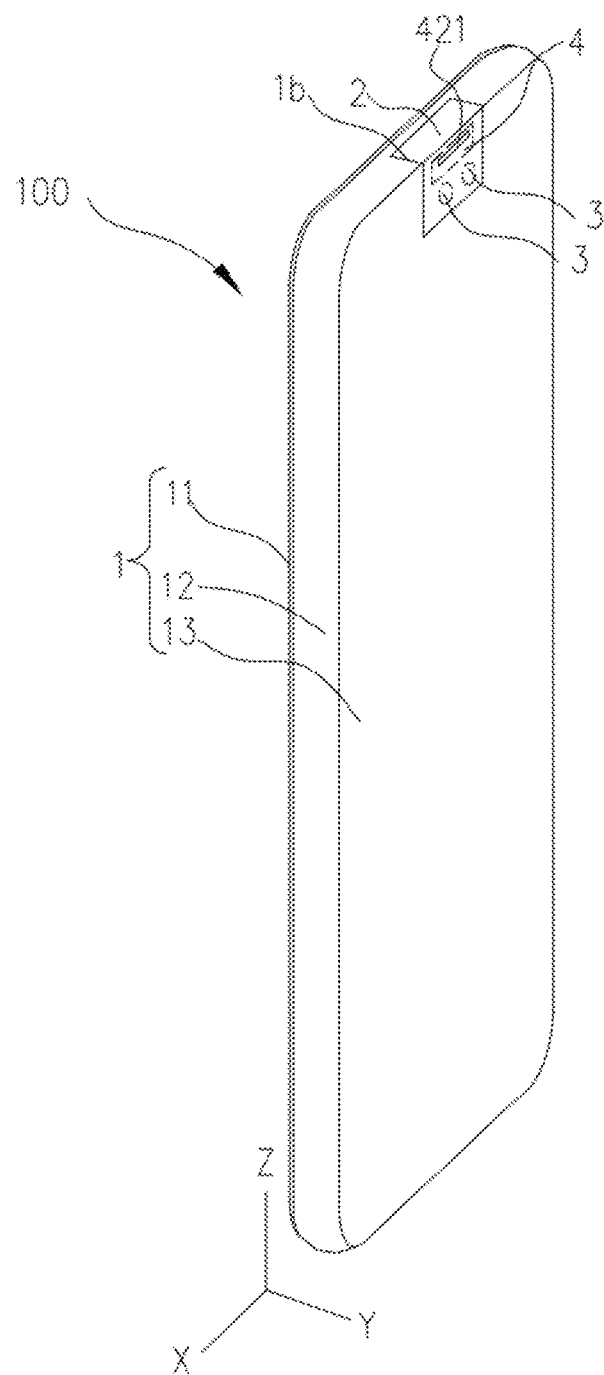
FIG. 1 is a schematic structure diagram illustrating an electronic device when a rotatable base is received in a receiving groove according to embodiments.

FIG. 1 is a schematic structure diagram illustrating an electronic device 100 according to an embodiment of the present disclosure. The electronic device 100 can be any device provided with a camera module 3 and a receiver module 4, such as a tablet computer, a TV, a mobile phone, a camera, a personal computer, a notebook computer, an in-vehicle device, a wearable device, and other smart devices. For ease of description, definition can be made with reference to a first viewing angle of the electronic device 100, for example, a width direction of the electronic device 100 is defined as X direction, a length direction of the electronic device 100 is defined as Y direction, and a thickness direction of the electronic device 100 is defined as Z direction.

As illustrated in FIG. 1, the electronic device 100 includes a device body 1 and a rotatable module 2 (e.g. is also called a foldable module). The device body 1 includes a display module 11, a frame 12, and a rear case 13. The rear case 13 is connected to a side of the frame 12 and the display module 11 is connected to an opposite side of the frame 12 to form a complete appearance of the electronic device 100. The display module 11, frame 12, and the rear case 13 surround to form a receiving cavity, and the receiving cavity can be used to enclose electronic components such as a battery and a circuit board.

Figure 2:
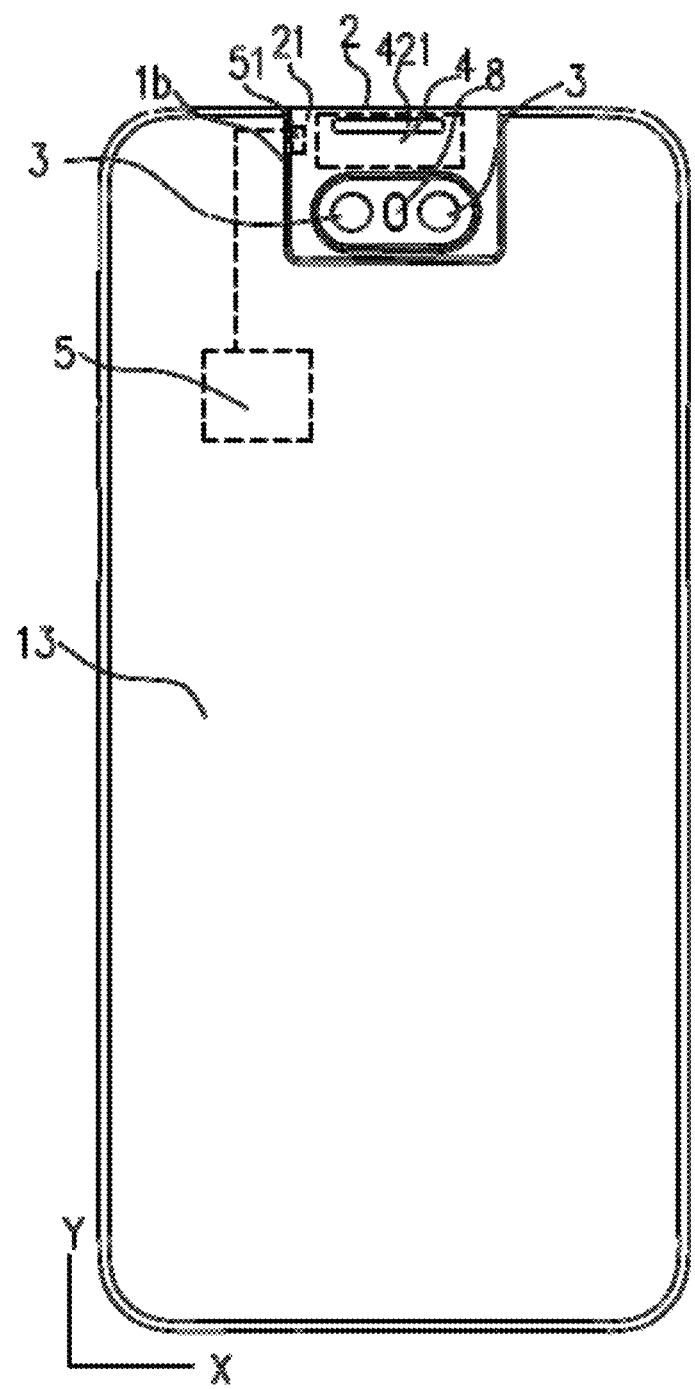
FIG. 2 is a schematic structure diagram illustrating the back of the electronic device illustrated in FIG. 1.
Figure 3:
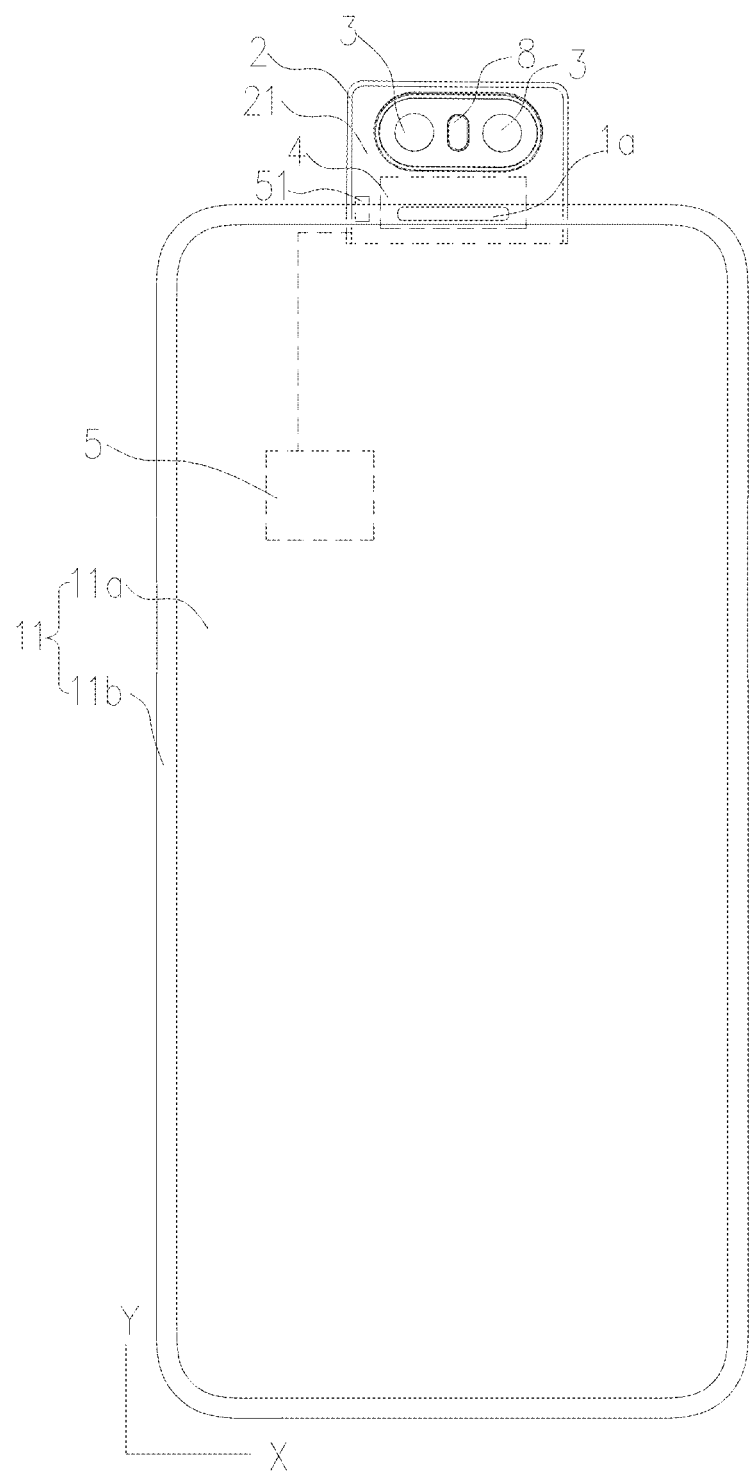
FIG. 3 is a front view illustrating the electronic device illustrated in FIG. 1 when the rotatable module is in an unfolded state.
Figure 4:
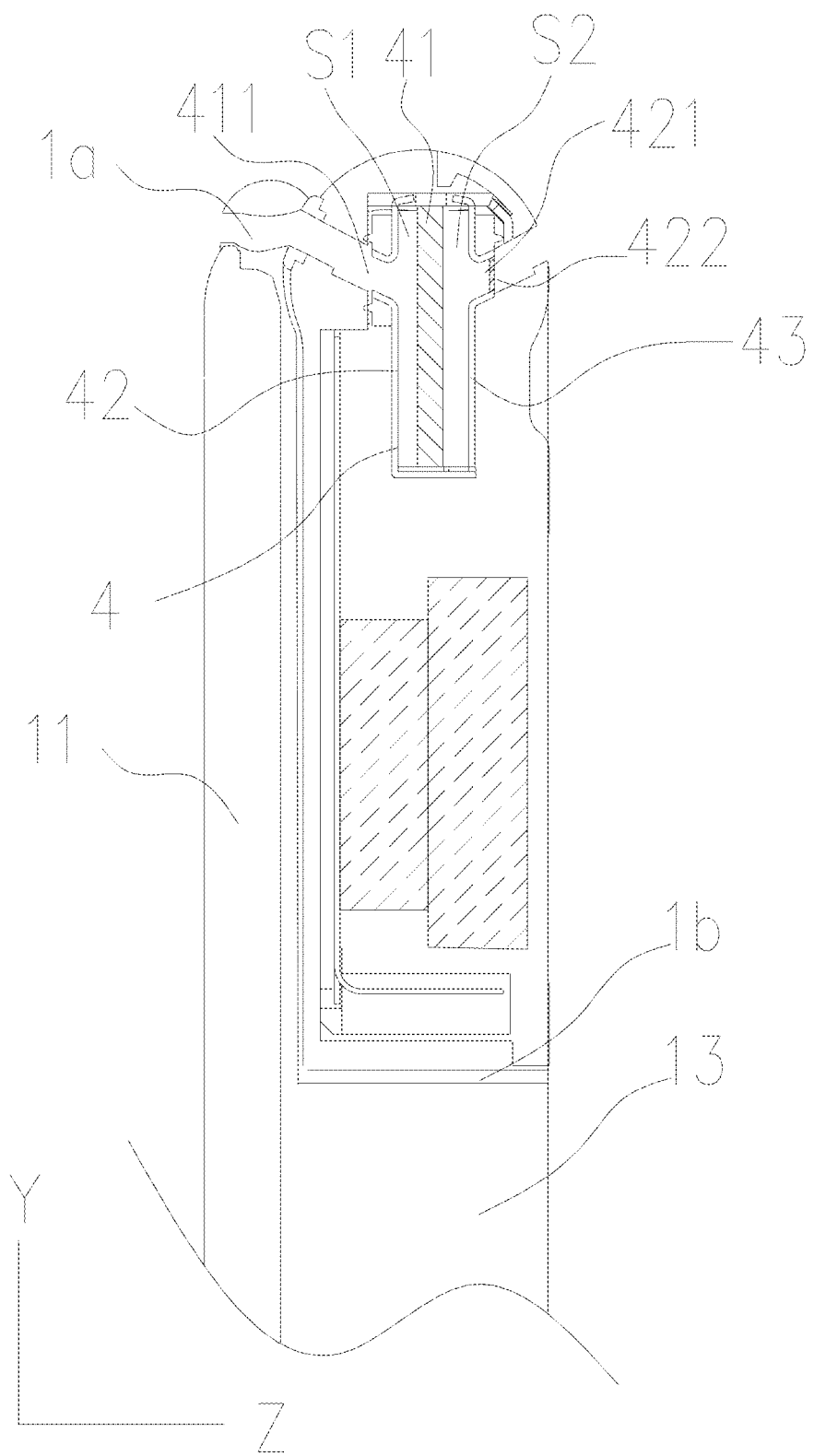
FIG. 4 is a schematic sectional view illustrating the rotatable module being folded with respect to the device body according to embodiment I.
Figure 5:
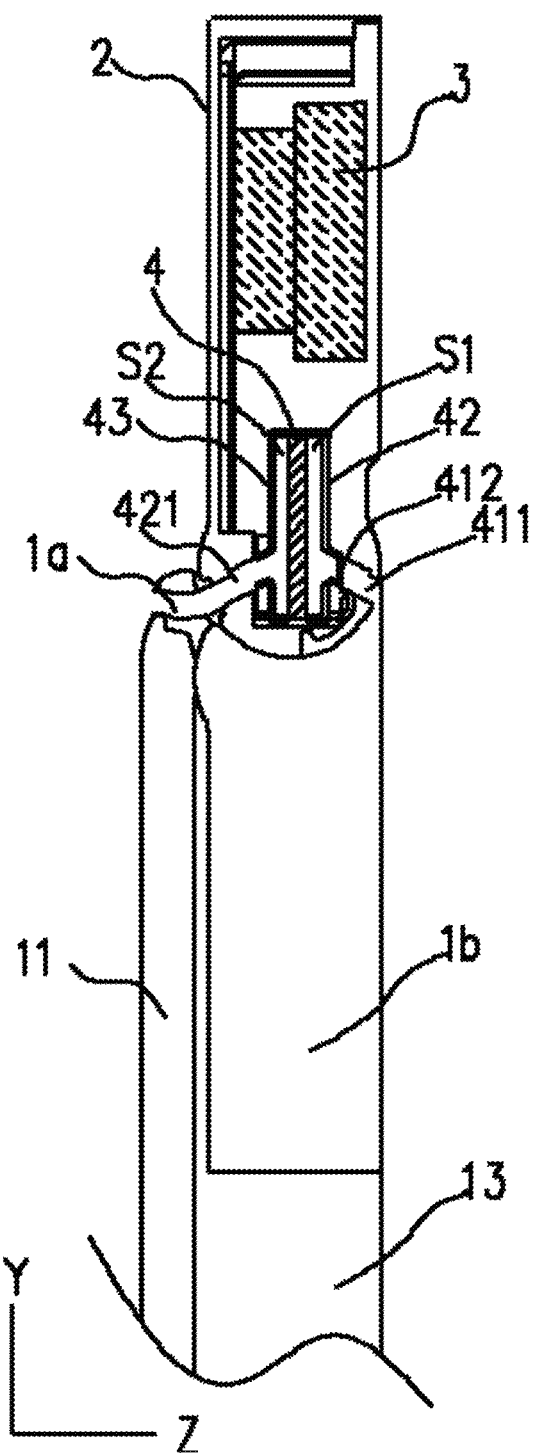
FIG. 5 is a schematic sectional view illustrating the rotatable module illustrated in FIG. 4 being unfolded relative to the device body.

As illustrated in FIGS. 2-5, the electronic device 100 includes the device body 1 and the rotatable module 2. The rotatable module 2 includes a rotatable base 21 (e.g. is also called a foldable module), a camera module 3, and a receiver module 4, where the camera module 3 and the receiver module 4 are received in the rotatable base 21. The rotatable module 2 is rotatably connected to the device body 1 to make the camera module 3 and the receiver module 4 be folded with respect to the device body 1 or be unfolded with respect to the device body 1. The device body 1 defines a receiver window 1a. The receiver module 4 defines a first sound-guide channel 411 on a side of the receiver module 4 and a second sound-guide channel 421 on an opposite side of the receiver module 4. As illustrated in FIG. 2 and FIG. 4, when the rotatable module 2 is folded with respect to the device body 1, the first sound-guide channel 411 is in communication with the receiver window 1a, so that the receiver module 4 can send sound waves out through the first sound-guide channel 411 and the receiver window 1a. As illustrated in FIG. 3 and FIG. 5, when the rotatable module 2 is unfolded with respect to the device body 1, the second sound-guide channel 421 is in communication with the receiver window 1a, so that the receiver module 4 can send the sound waves out through the second sound-guide channel 421 and the receiver window 1a. When the first sound-guide channel 411 is in communication with the receiver window 1a, one end of the first sound-guide channel 411 is aligned to and in contact with one end of the receiver window 1a. When the second sound-guide channel 421 is in communication with the receiver window 1a, one end of the second sound-guide channel 421 is opposite to and in contact with one end of the receiver window 1a.

When the rotatable module 2 is folded with respect to the device body 1, the device body 1 and the rotatable module 2 are stacked in a thickness direction of the electronic device 100. When the rotatable module 2 is unfolded with respect to the device body 1, the device body 1 and the rotatable module 2 are laid in a horizontal plane defined by a length direction and a width direction of the electronic device 100.

The camera module 3 and the receiver module 4 are received in the rotatable base 21, when the camera module 3 or the receiver module 4 needs to be used, the rotatable base 21 is controlled to be turned. As such, the camera module 3 and the receiver module 4 are unfolded with respect to the device body 1, and the first sound-guide channel 411 of the receiver module 4 is in communication with the receiver window 1a of the device body 1, so as to realize a front-photographing function of the camera module 3 and a receiving function of the receiver module 4. When the camera module 3 and the receiver module 4 are not needed or when a rear-photographing function of the camera module 3 or a receiving function of the receiver module 4 needs to be used, the rotatable base 21 is controlled to be rotated. As such, the camera module 3 and the receiver module 4 are folded with respect to the device body 1, and the second sound-guide channel 421 of the receiver module 4 is in communication with the receiver window 1a of the device body 1, so as to realize a rear-photographing function of the camera module 3 and a receiving function of the receiver module 4, thereby improving portability of the electronic device 100. The electronic device 100 does not need to be provided, on the display module 11, with a signal penetrating portion configured for signal communication of the camera module 3 and the receiver module 4, thereby improving the screen-to-body ratio of the electronic device.

During rotation of the rotatable module 2, the rotatable module 2 can be unfolded with respect to the device body 1 or folded with respect to the device body 1. As illustrated in FIG. 3, when the rotatable module 2 is unfolded with respect to the device body 1, orientation of a lens of the camera module 3 is consistent with orientation of a display of the display module 11, so that when a user faces the display of the display module 11, the user can perform self-portraits and other operations, that is, a function of a front camera can be achieved. In the meantime, the first sound-guide channel 411 is in communication with the receiver window 1a of the receiver module 4 to provide the user with a receiving function. As illustrated in FIG. 2, when the rotatable module 2 is folded with respect to the device body 1, the orientation of the lens of the camera module 3 in the rotatable module 2 is opposite to the orientation of the display of the display module 11, so that when the user faces the display of the display module 11, the user can perform operations such as shooting scenes seen by the user, that is, a function of a rear camera can be achieved. In the meantime, the second sound-guide channel 421 of the receiver module 4 is in communication with the receiver window 1a, to provide the user with the receiving function.

As an embodiment, as illustrated in FIG. 2 and FIG. 3, the device body 1 defines a receiving groove 1b. The rotatable module 2 is rotatably connected to the device body 1 in the receiving groove 1b. When the rotatable module 2 is unfolded with respect to the device body 1, the rotatable module 2 extends out the receiving groove 1b. When the rotatable module 2 is folded with respect to the device body 1, the rotatable module 2 is received in the receiving groove 1b. In this way, the rotatable module 2 can be received in the device body 1, thereby increasing appearance integrity of the electronic device 100 and improving portability of the electronic device 100. The shape of the rotatable base 21 matches the shape of the receiving groove 1b, so that the rotatable base 21 and the device body 1 form a complete appearance together.

As an embodiment, illustrated in FIG. 2 and FIG. 3, the electronic device 100 further includes a controller 5. The controller 5 is configured to control, according to a rotation state of the rotatable module 2, connectivity between the first sound-guide channel 411 and the receiver window 1a or connectivity between the second sound-guide channel 421 and the receiver window 1a.

As an embodiment, as illustrated in FIG. 2 and FIG. 3, the electronic device 100 further includes an angle sensor 51. The angle sensor 51 is electrically connected to the controller 5. The angle sensor 51 is configured to detect a rotation angle of the rotatable module 2 with respect to the device body 1. When the angle sensor 51 detects that the rotatable module 2 is unfolded with respect to the device body 1, a rotation angle of the rotatable module 2 with respect to the device body 1 is 180 degrees, the controller 5 controls the second sound-guide channel 421 to be in communication with the receiver window 1a. When the angle sensor 51 detects that rotatable module 2 is folded with respect to the device body 1, a rotation angle of the rotatable module 2 with respect to the device body 1 is 0 degrees, the controller 5 controls the first sound-guide channel 411 to be in communication with the receiver window 1a.

As an embodiment, as illustrated in FIG. 4 and FIG. 5, the electronic device 100 further includes a first baffle 412 and a second baffle 422. The first baffle 412 is disposed in the first sound-guide channel 411 and the second baffle 422 is disposed in the second sound-guide channel 421. When the rotatable module 2 is folded with respect to the device body 1, the controller 5 controls the first baffle 412 to open the first sound-guide channel 411 and controls the second baffle 422 to close the second sound-guide channel 421. In this way, when the rotatable module 2 is folded with respect to the device body 1, the first sound-guide channel 411 is in communication with the receiver window 1a of the device body 1, so that the receiver module 4 can send a sound signal out through the first sound-guide channel 411 and the receiver window 1a. As illustrated in FIG. 5, when the rotatable module 2 is unfolded with respect to the device body 1, the controller 5 controls the first baffle 412 to close the first sound-guide channel 411 and controls the second baffle 422 to open the second sound-guide channel 421. In this way, when the rotatable module 2 is unfolded with respect to the device body 1, the second sound-guide channel 421 is in communication with the receiver window 1a of the device body 1, so that the receiver module 4 can send the sound signal out through the second sound-guide channel 421 and the receiver window 1a.

Embodiments of sending, by the receiver module 4, the sound signal by controlling different sound-guide channels include but are not limited to the following.

As illustrated in FIG. 4 and FIG. 5, in embodiment I, the receiver module 4 includes a vibration portion 41 and a first sealing member 42 sealed on one side of the vibration portion 41. The first sealing member 42 seals the vibration portion 41 to form a first cavity S1 between the first sealing member 42 and the vibration portion 41. In other words, the first sealing member 42 is disposed on one side of the vibration portion 41. The first sealing member 42 and the vibration portion 41 form a first cavity S1 between the first sealing member 42 and the vibration portion 41. The first sound-guide channel 411 is defined on the first sealing member 4 and is in communication with the first cavity S1. When the first sound-guide channel 411 is in communication with the receiver window 1a, the sound signal generated by the vibration portion 41 passes through the first cavity S1, the first sound-guide channel 411, and the receiver window 1a, respectively, as the signal is sent out.

The receiver module 4 further includes a second sealing member 43. When the rotatable module 2 is folded with respect to the device body 1, the first sealing member 42 is close to the display module 11 of the electronic device 100. The second sealing member 43 seals the vibration portion 41 to form a second cavity S2 between the second seal member 43 and the vibration portion 41. In other words, the second sealing member 43 is disposed on another side of the vibration portion 41. The second sealing member 43 and the vibration portion 41 form a second cavity S2 between the second sealing member 43 and the vibration portion 41. The second sound-guide channel 421 is defined on the second sealing member 43 and in communication with the second cavity S2. When the second sound-guide channel 421 is in communication with the receiver window 1a, the sound signal generated by the vibration portion 41 passes through the second cavity S2, the second sound-guide channel 421, and the receiver window 1a, respectively, as the signal is sent out.

The receiver module 4 can include the first cavity S1, the vibration portion 41, and the second cavity S2, which may be sequentially stacked. The first cavity S1 defines the first sound-guide channel 411 and the second cavity S2 defines the second sound-guide channel 421. When the rotatable base 21 is controlled to be rotated between different states, the controller 5 controls different sound-guide channels to be connected or closed, so as to make the receiver module 4 send the sound signal through different sound-guide channels.

By changing the structure of the receiver module 4, sound output directions of the receiver module 4 in different states are changed, so that no matter when the receiver module 4 is unfolded with respect to the device body 1 or folded with respect to the device body 1, the receiver module 4 always has a sound-guide channel to be in communication with the receiver window 1a of the device body 1, so that the receiving function can be realized well when the rotatable base 2 is in different states.

Figure 6:
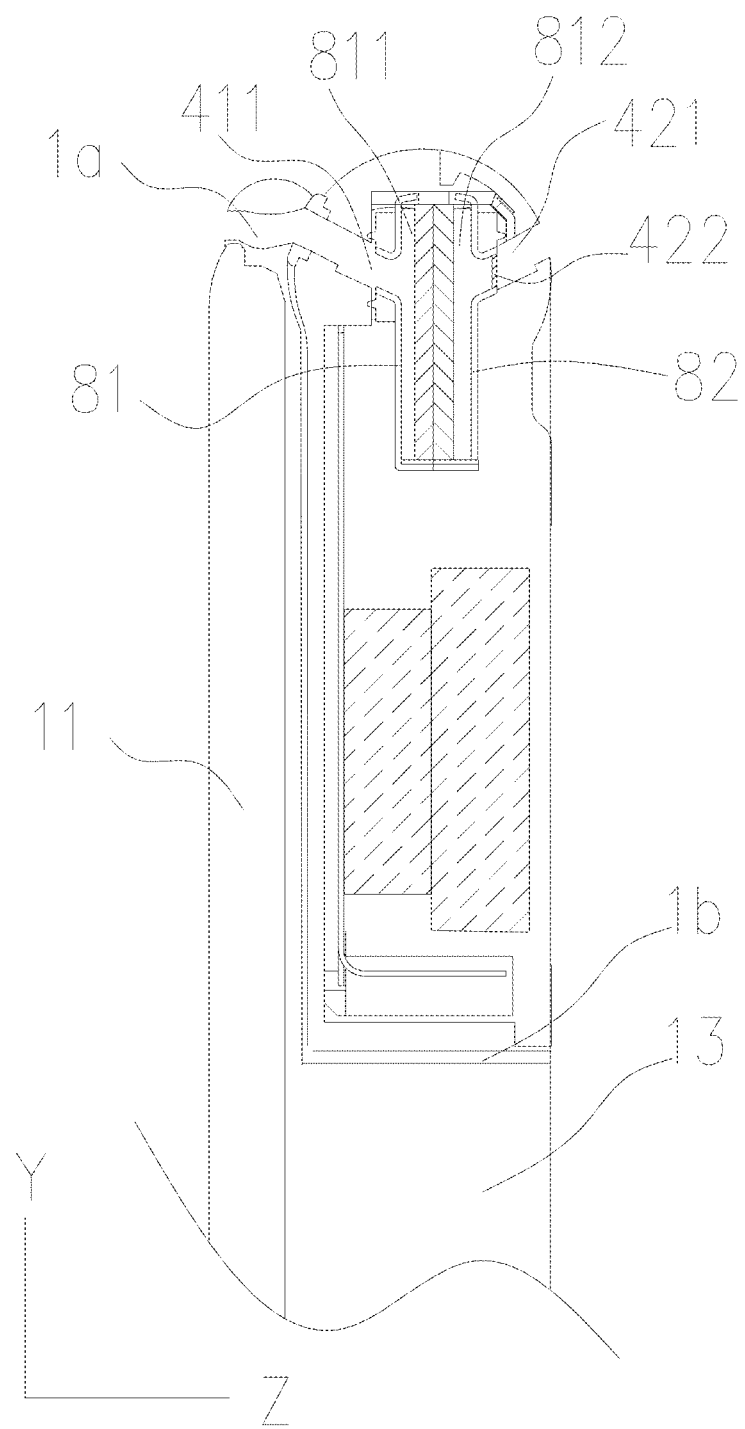
FIG. 6 is a schematic sectional view illustrating the rotatable module being folded with respect to the device body according to embodiment II.
Figure 7:
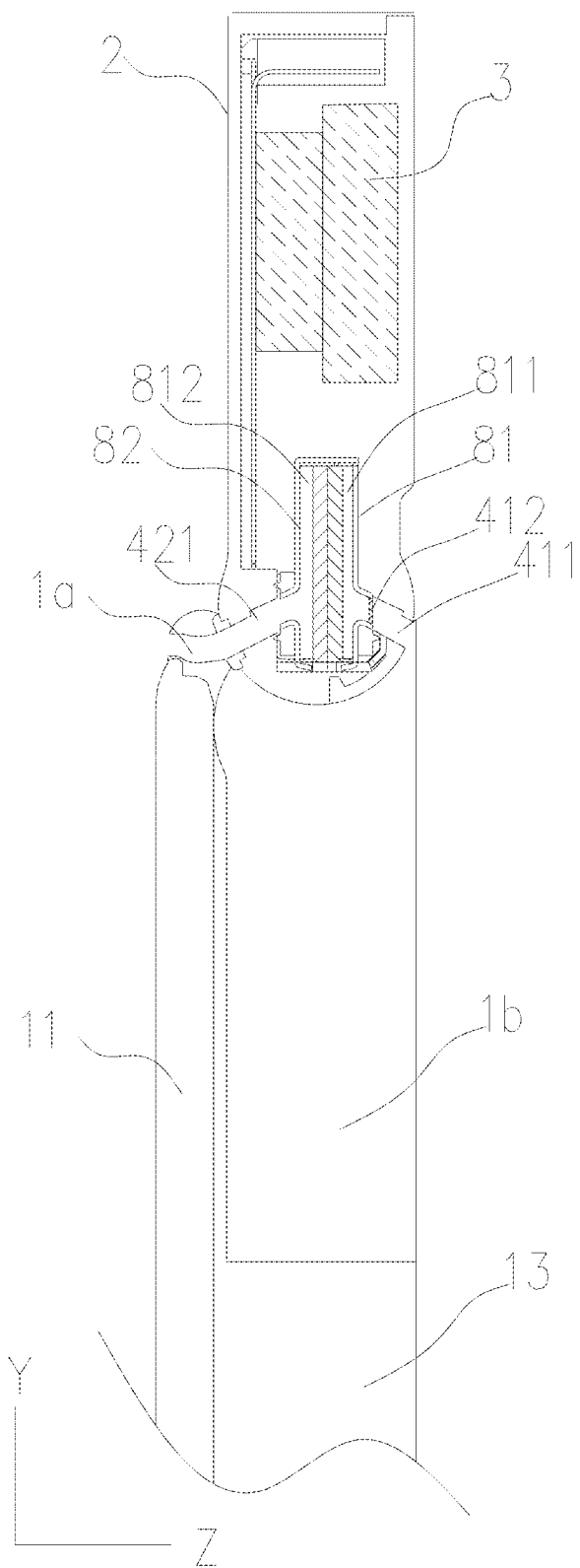
FIG. 7 is a schematic sectional view illustrating the rotatable module illustrated in FIG. 6 being unfolded relative to the device body.

FIG. 6 and FIG. 7 illustrate another embodiment, embodiment II, where the receiver module 4 includes a first receiver module 81 and a second receiver module 82 that is opposite to the first receiver module 81. The first receiver module 81 has a front sound cavity 811, which is in communication with the first sound-guide channel 411. The second receiver module 82 has a front sound cavity 812, which is in communication with the second sound-guide channel 421. As the first receiver module 81 is arranged opposite to the second receiver module 82, a sound output direction of the first receiver module 81 is opposite to a sound output direction of the second receiver module 82. The controller 5 is electrically connected to the first receiver module 81 and the second receiver module 82. The controller 5 is configured to control, according to the rotation state of the rotatable module 2, the first receiver module 81 or the second receiver module 82 to send the sound signal out.

As an example, the electronic device 100 includes an angle sensor 51. When the angle sensor 51 detects that the rotatable module 2 is folded with respect to the device body 1, the angle sensor 51 sends a first instruction to the controller 5. The controller 5 controls, according to the first instruction, the first sound-guide channel 411 to be opened and the second sound-guide channel 421 to be closed. When the angle sensor 51 detects that the rotatable module 2 is unfolded with respect to the device body 1, the angle sensor 51 sends a second instruction to the controller 5. The controller 5 controls, according to the second instruction, the first sound-guide channel 411 to be closed and the second sound-guide channel 421 to be opened.

As another embodiment, when the angle sensor 51 detects that the rotatable module 2 is folded with respect to the device body 1, the angle sensor 51 sends the first instruction to the controller 5. The controller 5 controls, according to the first instruction, the first receiver module 81 to send the sound signal, and the sound signal passes through the first sound-guide channel 411 and the receiver window 1a to external environment. When the angle sensor 51 detects that the rotatable module 2 is unfolded with respect to the device body 1, the angle sensor 51 sends the second instruction to the controller 5. The controller 5 controls, according to the second instruction, the second receiver module 82 to send the sound signal, and the sound signal passes through the second sound-guide channel 421 and the receiver window 1a to the external environment.

The first receiver module 81 and second the receiver module 82 are disposed oppositely. The sound output direction of the first receiver module 81 can be opposite to the sound output direction of the second receiver module 82, so that when the receiver module 4 is unfolded with respect to the device body 1 or the receiver module 4 is folded with respect to the device body 1, a sound-guide channel of either the first receiver module 81 or the second receiver module 82 can be in communication with the receiver window 1*a* of the device body 1. In this way, the receiving function can be realized well when the rotatable base 2 is rotated between different states.

Figure 8:
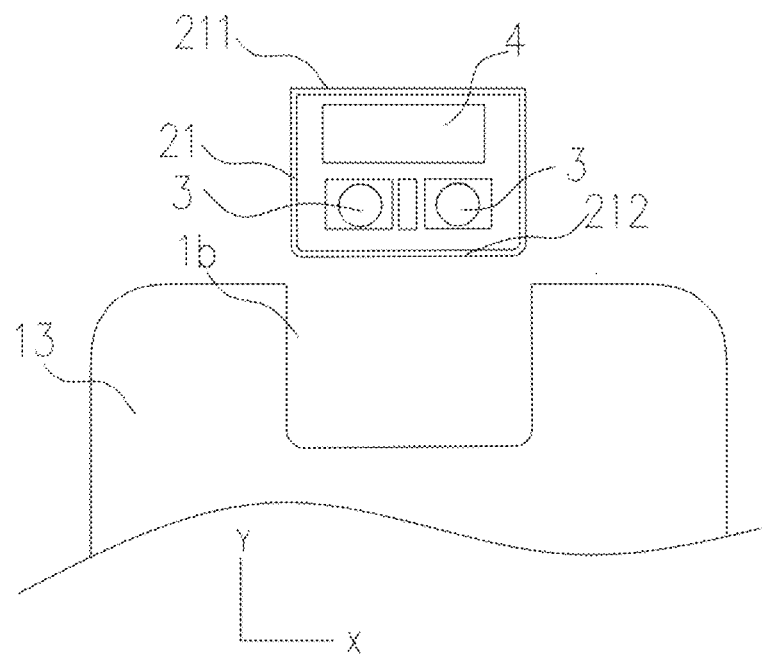
FIG. 8 is a schematic split structure diagram illustrating the electronic device illustrated in FIG. 1.

As an embodiment, as illustrated in FIG. 8, the rotatable base 21 includes a connecting end 211 and a free end 212 which is opposite to the connecting end 211. The connecting end 211 is connected to the device body 1. During rotation of the rotatable base 21, the free end 212 rotates about the connecting end 211. The camera module 3 can be located adjacent (e.g. close) to the free end 212. The receiver module 4 can be disposed between the camera module 3 and the connecting end 211. In other words, the receiver module 4 can be located adjacent (e.g. close) to the connecting end 211.

The receiver window 1*a* of the device body 1 is disposed at a position corresponding to the receiver module 4 when the rotatable base 21 is unfolded. The receiver module 4 is close to the connecting end 211, when the rotatable base 21 is unfolded with respect to the device body 1, the receiver module 4 can still be in close contact with the device body 1, so that the receiver module 4 can be connected to the receiver window 1*a* of the device body 1. As receiver module 4 is close to the connecting end 211, the receiver window 1*a* can be close to the connecting end 211, so that the receiver window 1*a* does not need to be disposed on the display module 11, thereby reducing production cost of the display module 11, simplifying manufacturing process of the display module 11, and increasing the screen-to-body ratio of the electronic device 100.

Figure 9:
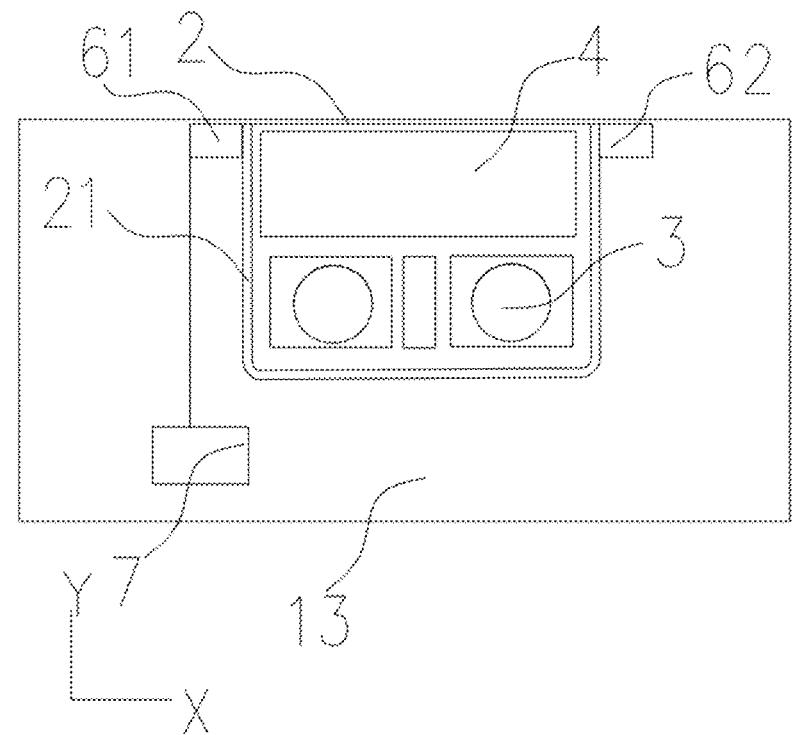
FIG. 9 is a schematic diagram illustrating a partial structure of the electronic device illustrated in FIG. 1.

As an embodiment, as illustrated in FIG. 9, the electronic device 100 further includes a first rotating portion 61 and a second rotating portion 62. The first rotating portion 61 is disposed on one side of the rotatable base 21 and the second rotating portion 62 is disposed on an opposite side of the rotatable base 21. The first rotating portion 61 is connected between the rotatable base 21 and the device body 1 and the second rotating portion 62 is connected between the rotatable base 21 and the device body 1. The receiver module 4 is disposed between the first rotating portion 61 and the second rotating portion 62. In other words, the receiver module 4, the first rotating portion 61, and the second rotating portion 62 are arranged along X direction. This arrangement can advantageously reduce space occupied by the receiver module 4 in Y direction, thereby reducing the size of the rotatable module 2 and reducing a driving force for rotation of the rotatable module 2, which can be beneficial to flexible rotation of the rotatable module 2. Additionally, the structure can also reduce space occupied by the rotatable module 2 in the electronic device 100, improve compactness of the electronic device 100, and promote a slimmer and lighter electronic device 100.

As an embodiment, the first rotating portion 61 and the second rotating portion 62 have a same central axis (in other words, the central axis of the first rotating portion 61 and the central axis of the second rotating portion 62 can be collinear). The first rotating portion 61 runs through a side of the rotatable base 21 and second rotating portion 62 runs through an opposite side of the rotatable base 21. When at least one of the first rotating portion 61 and second rotating portion 62 rotates, the rotatable base 21 rotates around the central axis of the first rotating portion 61 and the second rotating portion 62 as at least one of the first rotating portion 61 and second rotating portion 62 rotates, so as to realize a state where the rotatable base 21 is unfolded with respect to the device body 1 or the rotatable base 21 is folded with respect to the device body 1.

As illustrated in FIG. 9, the electronic device 100 further includes a driving member 7. The driving member 7 is connected to the first rotating portion 61 to drive the first rotating portion 61 to rotate. The rotatable base 21 rotates as the first rotating portion 61 rotates. The first rotating portion 61 can be fixedly connected (e.g. snap-connected, detachably connected, bonded, integrally connected, screwed, welded, etc.) with the rotatable base 21, or the first rotating portion 61 can be movably connected (e.g. slidably connected, etc.) with the rotatable base 21. However, along a direction of the central axis of the first rotating portion 61 and the second rotating portion 62, the first rotating portion 61 and the rotatable base 21 are relatively fixed. As an embodiment, the driving member 7 can be a micro motor or a micro electric machine. The driving member 7 has a rotating bearing which is connected to a first end of the first rotating portion 61 and drives the first rotating portion 61 to rotate around the central axis of the first rotating portion 61, so as to drive the rotatable base 21 to rotate. The driving member 7 drives the rotating bearing to rotate clockwise or counterclockwise, to cause the rotatable base 21 to unfold with respect to the device body 1 or folded with respect to the device body 1.

Figure 10:
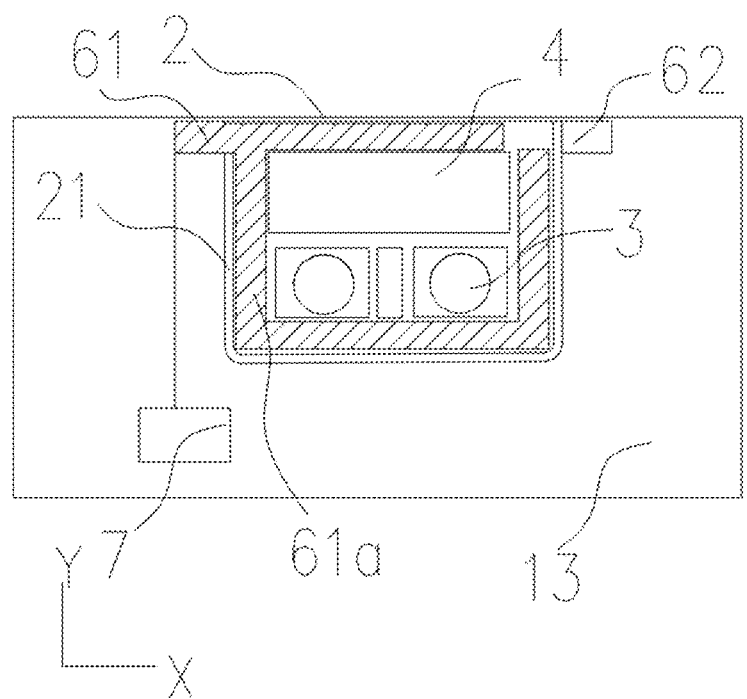
FIG. 10 is a schematic diagram illustrating a partial structure of the electronic device illustrated in FIG. 1.

As an embodiment, as illustrated in FIG. 10, the first rotating portion 61 has an extension portion 61*a* at one end, and the extension portion 61*a* is disposed away from the first end. The extension portion 61*a* is disposed in the rotatable base 21, and the extension portion 61*a* is disposed around the receiver module 4 and the camera module 3. The extension portion 61*a* is configured to drive the rotatable base 21 to rotate under the driving of the first rotating portion 61. As an embodiment, the extension portion 61*a* can surround or semi-enclose the receiver module 4 and the camera module 3, and serves as a supporting frame for the receiver module 4 and the camera module 3. The extension portion 61*a* can avoid changing layout of the camera module 3 and the receiver module 4, and can protect the camera module 3 and the receiver module 4 from collision damage. The first rotating portion 61 can be made of a material such as hard metal, so that structural strength of the rotatable base 21 can be increased, and firmness of the rotatable module 2 during rotation can be improved.

Figure 11:
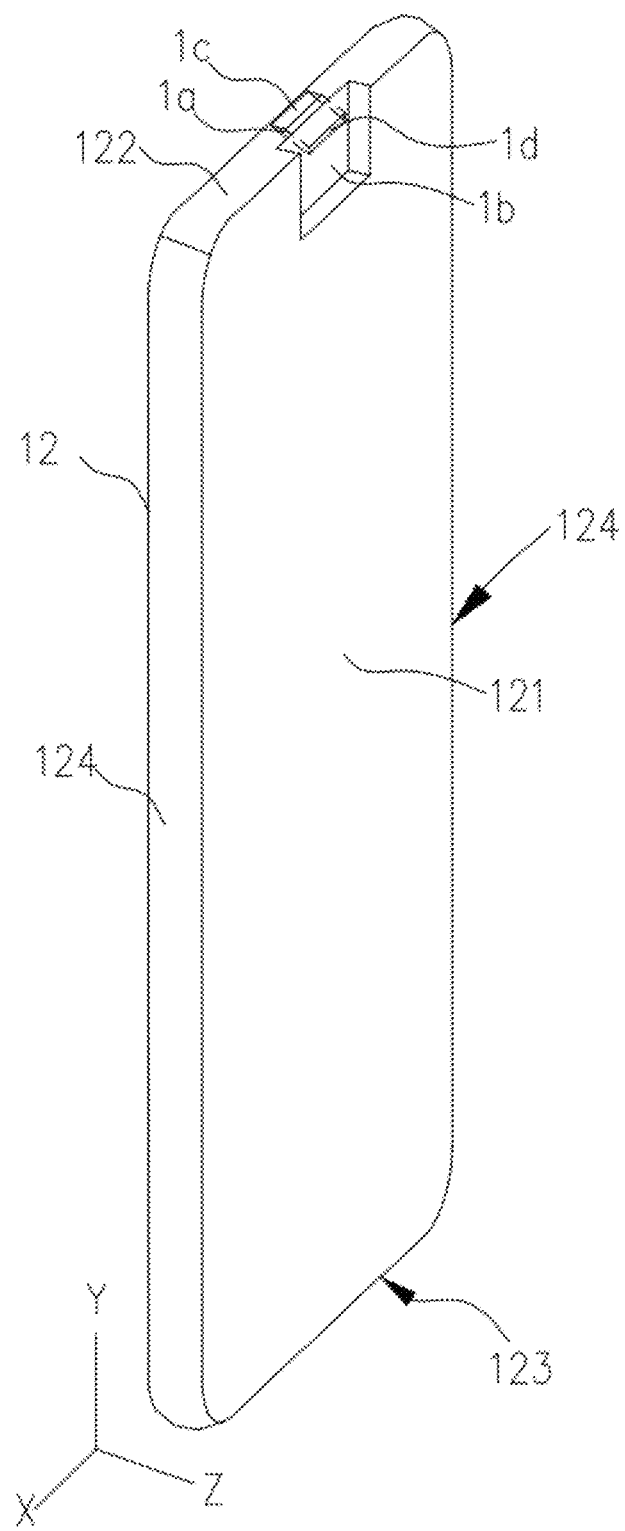
FIG. 11 is a schematic structure diagram illustrating a housing of the electronic device illustrated in FIG. 1.

As an embodiment, as illustrated in FIG. 11, the frame 12 can be substantially rectangular. The frame 12 includes a middle plate 121, a top edge 122, a bottom edge 123, and a pair of side edges 124. The top edge 122 and the bottom edge 123 surround the middle plate 121 and the top edge 122 is opposite to the bottom edge 123. The pair of side edges 124 each are connected between the top edge 122 and the bottom edge 123. When the electronic device 100 is held vertically, the top edge 122 of the device body 1 is away from the ground than the bottom edge 123.

As an embodiment, the receiving groove 1*b* is defined on the rear case 13 and close to the top edge 122. The receiving groove 1*b* runs through the device body 1. The receiver window 1*a* runs through the device body 1. The receiver window 1*a* has a first opening 1*c*, and the first opening 1*c* is defined on the top edge 122 and between a side edge of the receiving groove 1*b* and a side edge of the display module 11. The receiver window 1a has a second opening 1d, and the second opening 1d is defined on a side of the receiving groove 1b facing the rear case 13.

When the user faces the display of the display module 11, the first opening 1c of the receiver window 1a faces the user substantially, so that more sound signals can be received by the user, and sound output quality of the electronic device 100 can be improved. As another embodiment, the receiver window 1a can be defined on the display module 11, so that orientation of the first opening 1c of the receiver window 1a is consistent with orientation of the display module 11, thereby improving the sound quality of the electronic device 100.

When the rotatable base 21 unfolded with respect to the device body 1, the receiver module 4 is sealed and docked with the second opening 1d. The receiver module 4 sends the sound signal to the external environment through the second opening 1d and the first opening 1c.

As another embodiment, the receiving groove 1b can also be defined on the rear case 13, and the receiving groove 1b runs through one of the pair of the side edges 124. The receiver window 1a can also be defined on the one of the pair of the side edges 124 which is ran through by the receiving groove 1b. The receiver window 1a is close to the receiver module 4, so that the receiver module 4 can be sealed and docked with the receiver window 1a when the rotatable base 21 is unfolded.

As another embodiment, the receiving groove 1b can also be defined on the rear case 13 and close to the bottom edge 123, and the receiving groove 1b runs through the bottom edge 123. In this way, the rotatable module 2 can be disposed at the bottom of the electronic device 100, and the rotatable module 2 can be provided with a fingerprint module, a speaker module, and the like. In addition, the number of the rotatable module 2 can be multiple, and the multiple rotatable modules 2 can be disposed in a same surface or different surfaces of device body 1, which makes the electronic device 100 have different forms, enriches application scenarios of the electronic device 100, increases functions of the electronic device 100, and improves the screen-to-body ratio of the electronic device 100.

As another embodiment, the receiver window 1a can also be defined on the rotatable base 21. When the rotatable module 2 is unfolded with respect to the device body 1, the second opening 1d of the receiver window 1a faces the user, thereby preventing the device body 1 from being perforated. In this way, the rotatable module 2 can be close to the display module 11, compactness of the electronic device 100 can be improved, and thickness of the electronic device 100 can be reduced.

The rotatable base 21 can be provided with at least one functional component. The functional component can face the user as the rotatable base 21 rotates for interaction with the user. The functional component can include at least one of: an iris recognition module, a face recognition module, and a flashlight module, a microphone module, a sensor module, a fingerprint recognition module, and a camera module. As an embodiment, illustrated in FIG. 2 and FIG. 3, the rotatable base 21 is provided with the receiver module 4, a dual-camera module 3, the flashlight module 8, and the like. The receiver module 4 is disposed between the first rotating portion 61 and the second rotating portion 62, the dual-camera module 3 and the receiver module 4 are arranged side by side along Y direction, and the dual-camera module 3 is arranged along X direction. The flashlight module 8 is arranged between two cameras of the dual-camera module 3. When the rotatable base 21 is folded with respect to the device body 1, the dual-camera module 3 serves as rear cameras, and the flashlight module 8 supplements the rear cameras with light. When the rotatable base 21 is unfolded with respect to the device body 1, the dual-camera module 3 serves as front cameras, and the flashlight module 8 supplements the front cameras with light. A receiver provides a receiving function.

As illustrated in FIG. 3, the display module 11 has a display region 11a for displaying images and a non-display region 11b surrounding the display region 11a. When the rotatable base 21 is received in the receiving groove 1b, the display region 11a at least partially covers the camera module 3 and the receiver module 4. As signal penetrating portions corresponding to the camera module 3 and the receiver module 4 do not need to occupy positions of the display region 11a, the display region 11a can have as large a region as possible and be close to an edge of the display module 11, thereby improving the screen-to-body ratio of the display module 11, convenience for operation, and user experience.

An initial state of the rotatable base 21 is that the rotatable base 21 is folded with respect to the device body 1. When the camera module 3 or the receiver module 4 needs to be used, the rotatable base 21 is controlled to be rotated. In this way, the camera module 3 and the receiver module 4 are unfolded with respect to the device body 1, and the first sound-guide channel 411 of the receiver module 4 is in communication with the receiver window 1a of the device body 1, so as to realize a front-photographing function of the camera module 3 and a receiving function of the receiver module 4. When the camera module 3 and the receiver module 4 do not need to be used or when a rear-photographing function of the camera module 3 or a receiving function of the receiver module 4 needs to be used, the rotatable base 21 is controlled to be rotated. In this way, the camera module 3 and the receiver module 4 are folded with respect to the device body 1, and the second sound-guide channel 421 of the receiver module 4 is in communication with the receiver window 1a of the device body 1, so as to realize the rear-photographing function of the camera module 3 and the receiving function of the receiver module 4, thereby improving portability of the electronic device 100. The electronic device 100 does not need to be provided, on the display module 11, with a signal penetrating portion configured for signal communication of the camera module 3 and the receiver module 4, thereby improving the screen-to-body ratio of the electronic device.

Figure 12:
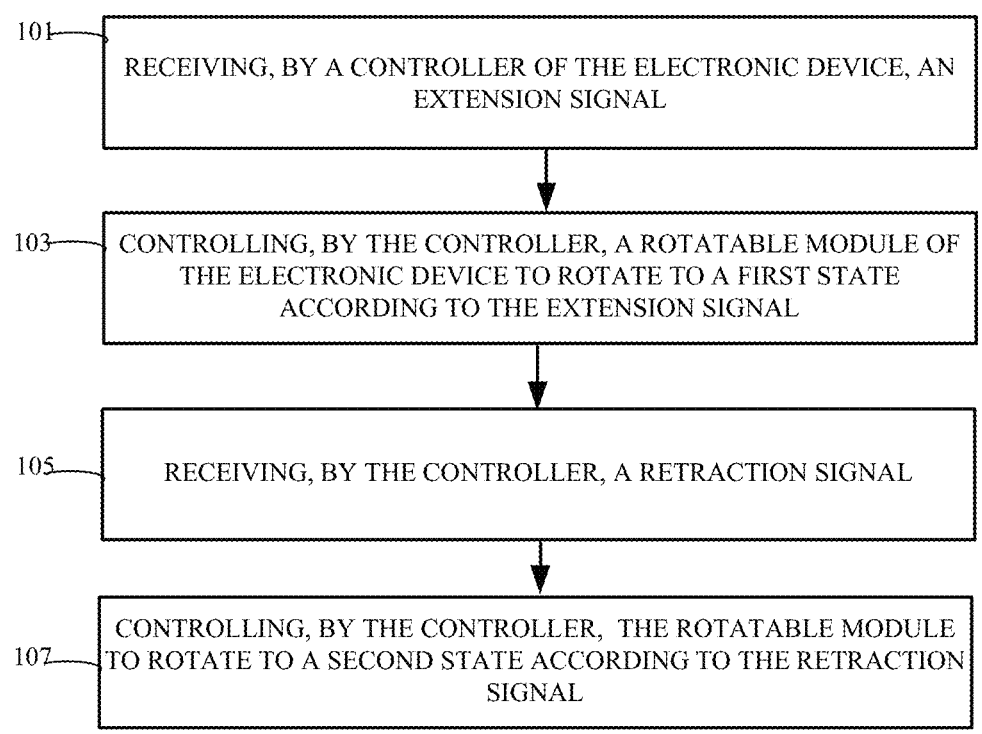
FIG. 12 is a schematic flow chart illustrating a control method of an electronic device according to embodiments.

As illustrated in FIG. 12, a control method 10 of the electronic device 100 is also provided in embodiments, and the control method 10 can be applicable to the electronic device 100 in any of above-mentioned embodiments. The controlling method 10 can includes the following.

Step 101, the controller 5 receives an extension signal.

Step 103, the controller 5 controls the rotatable module 2 to rotate to a first state according to the extension signal, where in the first state, the rotatable module is unfolded with respect to the device body 1.

As an embodiment, the electronic device 100 further includes an angle sensor 51, and the angle sensor 51 is configured to detect a rotation angle of the rotatable module 2.

The controller 5 can control the rotatable module 2 to rotate to the first state according to the extension signal as follows.

When the angle sensor 51 detects that the rotatable module 2 rotates to a preset angle (e.g. a first preset angle, which is 180 degrees with respect to the device body 1), the angle sensor 51 sends a first trigger signal to the controller 5. The controller 5 controls the rotatable module 2 to stop rotation according to the first trigger signal. The controller 5 further controls the first sound-guide channel 411 to be closed and controls the second sound-guide channel 421 to be in communication with the receiver window 1a. When the rotatable module 2 rotates to the first preset angle, the rotatable module 2 is unfolded with respect to the device body 1.

Step 105, the controller 5 receives a retraction signal.

Step 107, the controller 5 controls the rotatable module 2 to rotate to a second state according to the retraction signal, where in the second state, the rotatable module 2 is folded with respect to the device body 1.

The controller can control the rotatable module to rotate to the second state according to the retraction signal as follows.

When the angle sensor 51 detects that the rotatable module 2 rotates to a preset angle (e.g. a second preset angle, which is 0 degree with respect to the device body 1), the angle sensor 51 sends a second trigger signal to the controller 5. The controller 5 controls the rotatable module 2 to stop rotation according to the second trigger signal. The controller 5 further controls the second sound-guide channel 421 to be closed and controls the first sound-guide channel 411 to be in communication with the receiver window 1a. When the rotatable module 2 rotates to the second preset angle, the rotatable module 2 is folded with respect to the device body 1.

When the rotatable base 21 is unfolded with respect to device body 1, the camera module 3 and the receiver module 4 can extend out of the display module 11 to interact with the user, thereby preventing the display module 11 from being perforated to emit the sound signal of the receiver module 4, and preventing the display module 11 from being defined with a light-transmitting area for transmitting a light signal of the camera module 3. As such, manufacturing process of the display module 11 can be simplified and size of the display region of the display module 11 can be increased.

While the disclosure has been described in connection with certain embodiments, it is to be understood that the disclosure is not to be limited to the disclosed embodiments but, on the contrary, is intended to cover various modifications and equivalent without departing from the principles of the disclosure.

What is claimed is:

1. An electronic device comprising:
    a rotatable module, comprising a rotatable base, a camera module, and a receiver module;
    a device body defining a receiver window, the rotatable module being rotatably connected to the device body;
    wherein the camera module and the receiver module are mounted in the rotatable base, the receiver module defines a first sound-guide channel on a side of the receiver module and a second sound-guide channel on an opposite side of the receiver module;
    wherein the first sound-guide channel is in communication with the receiver window when the rotatable module is folded with respect to the device body; and
    wherein the second sound-guide channel is in communication with the receiver window when the rotatable module is unfolded with respect to the device body.

2. The electronic device of claim 1, further comprising a controller;
    wherein the controller is configured to control, according to a rotation state of the rotatable module, connectivity between the first sound-guide channel and the receiver window or connectivity between the second sound-guide channel and the receiver window.

3. The electronic device of claim 2, further comprising an angle sensor;
    wherein the angle sensor is electrically connected to the controller, and the controller is configured to perform one of the following:
    control the first sound-guide channel to be in communication with the receiver window when the angle sensor detects that the rotatable module is folded with respect to the device body; and
    control the second sound-guiding channel to be in communication with the receiver window when the angle sensor detects that the rotatable module is unfolded with respect to the device body.

4. The electronic device of claim 2, further comprising a first baffle and a second baffle;
    wherein the first baffle is disposed in the first sound-guide channel, the second baffle is disposed in the second sound-guide channel, and the controller is configured to perform one of the following:
    control the first baffle to open the first sound-guide channel and control the second baffle to close the second sound-guide channel when the angle sensor detects that the rotatable module is folded with respect to the device body; and
    control the first baffle to close the first sound-guide channel and control the second baffle to open the second sound-guide channel when the rotatable module is unfolded with respect to the device body.

5. The electronic device of claim 2, wherein the receiver module further comprises a vibration portion and a first sealing member sealed on one side of the vibration portion;
    wherein the first sealing member seals the vibration portion to form a first cavity between the first sealing member and the vibration portion, the first sound-guide channel is defined on the first sealing member and in communication with the first cavity; and
    wherein when the first sound-guide channel is in communication with the receiver window, a sound signal generated by the vibration portion passes through the first cavity, the first sound-guide channel, and the receiver window.

6. The electronic device of claim 5, wherein the receiver module further comprises a second sealing member;
    wherein the second sealing member is sealed on a side of the vibration portion away from the first sealing member, the second sealing member seals the vibration portion to form a second cavity between the second seal member and the vibration portion;
    wherein the second sound-guide channel is defined on the second seal member and in communication with the second cavity; and
    wherein when the second sound-guide channel is in communication with the receiver window, the sound signal generated by the vibration portion passes through the second cavity, the second sound-guide channel, and the receiver window.

7. The electronic device of claim 2, wherein the receiver module further comprises a first receiver module and a second receiver module which is opposite to the first receiver module;
    wherein the first receiver module has a front sound cavity in communication with the first sound-guide channel, the second receiver module has a front sound cavity in communication with the second sound-guide channel;

wherein the controller is electrically connected to the first receiver module and the second receiver module, and the controller is configured to control, according to the rotation state of the rotatable module, the first receiver module or the second receiver module to send a sound signal.

8. The electronic device of claim 1, wherein the rotatable base comprises a connecting end and a free end which is opposite to the connecting end;
wherein the connecting end is connected to the device body, the camera module is adjacent to the free end, and the receiver module is disposed between the camera module and the connecting end.

9. The electronic device of claim 8, further comprising a first rotating portion and a second rotating portion;
wherein the first rotating portion is disposed on a side of the rotatable base and the second rotating portion is disposed on an opposite side of the rotatable base, both the first rotating portion and the second rotating portion are connected between the rotatable base and the device body, and the receiver module is disposed between the first rotating portion and the second rotating portion.

10. The electronic device of claim 9, further comprising a driving member;
wherein the driving member is connected to the first rotating portion to drive the first rotating portion to rotate, and the rotatable base rotates as the first rotating portion rotates.

11. The electronic device of claim 9, wherein the first rotating portion has an extension portion at one end, the extension portion being disposed in the rotatable base, the extension portion being disposed around the receiver module and the camera module, and the extension portion being configured to drive the rotatable base to rotate under driving of the first rotating portion.

12. The electronic device of claim 9, wherein the first rotating portion and the second rotating portion have a same central axis, and the first rotating portion runs through a side of the rotatable base and the second rotating portion runs through an opposite side of the rotatable base to make the rotatable base rotate around the central axis of the first rotating portion and the second rotating portion.

13. The electronic device of claim 1, wherein the device body defines an receiving groove, when the rotatable module is unfolded with respect to the device body, the rotatable module extends out of the receiving groove, and when the rotatable module is folded with respect to the device body, the rotatable module is received in the receiving groove.

14. The electronic device of claim 13, wherein the device body comprises a display module, a frame, and a rear case, the rear case is connected to a side of the frame and the display module is connected to an opposite side of the frame, the frame comprises a top edge, a bottom edge opposite to the top edge, and a pair of side edges each connected between the top edge and the bottom edge, and the receiving groove is disposed on the rear case and runs through the top edge.

15. The electronic device of claim 14, wherein the receiver window runs through the device body and has an opening, the opening being on the top edge and between a side edge of the receiving groove and a side edge of the display module, and the receiver window having another opening on a side of the receiving groove facing the rear case.

16. The electronic device of claim 14, wherein the display module has a display region for displaying images, and when the rotatable module is received in the receiving groove, the display region at least partially covers the camera module and the receiver module.

17. The electronic device of claim 1, wherein the rotatable module further comprises a functional component, and the functional component comprises at least one of: a receiver module, an iris recognition module, a face recognition module, and a flashlight, a microphone module, a sensor module, a fingerprint recognition module, and a camera module.

18. A method of controlling an electronic device, comprising:
receiving, by a controller of the electronic device, an extension signal;
controlling, by the controller, a rotatable module of the electronic device to rotate to a first state according to the extension signal, wherein in the first state, the rotatable module is unfolded with respect to a device body the electronic device; wherein the device body defines a receiver window, the rotatable module is rotatably connected to the device body, the rotatable module comprises a rotatable base, a camera module, and a receiver module, wherein the camera module and the receiver module are mounted in the rotatable base, the receiver module defines a first sound-guide channel on a side of the receiver module and a second sound-guide channel on an opposite side of the receiver module, wherein the second sound-guide channel is in communication with the receiver window when the rotatable module is unfolded with respect to the device body;
receiving, by the controller, a retraction signal; and
controlling, by the controller, the rotatable module to rotate to a second state according to the retraction signal, wherein in the second state, the rotatable module is folded with respect to the device body, wherein the first sound-guide channel is in communication with the receiver window when the rotatable module is folded with respect to the device body.

19. The control method of claim 18, further comprising:
sending, by an angle sensor of the electronic device, a first trigger signal to the controller when the angle sensor detects that the rotatable module rotates to a preset angle, wherein the angle sensor is configured to detect a rotation angle of the rotatable module;
controlling, by the controller, the rotatable module to stop rotation according to the first trigger signal; and
controlling, by the controller, the first sound-guide channel to be closed and controlling the second sound-guide channel to be in communication with the receiver window.

20. The control method of claim 18, further comprising:
sending, by an angle sensor of the electronic device, a second trigger signal to the controller when the angle sensor detects that the rotatable module rotates to a preset angle, wherein the angle sensor is configured to detect a rotation angle of the rotatable module;
controlling, by the controller, the rotatable module to stop rotation according to the second trigger signal; and
controlling, by the controller, the second sound-guide channel to be closed and controlling the first sound-guide channel to be in communication with the receiver window.

* * * * *